United States Patent [19]

Yamaguchi et al.

[11] Patent Number: 4,841,504
[45] Date of Patent: Jun. 20, 1989

[54] METHOD AND APPARATUS FOR RECORDING AN INFORMATION SIGNAL ON A ROTARY RECORDING MEDIUM

[75] Inventors: Hirohisa Yamaguchi, Tokyo; Akira Mashimo, Tokorozawa, both of Japan

[73] Assignee: Teac Corporation, Tokyo, Japan

[21] Appl. No.: 73,979

[22] Filed: Jul. 14, 1987

[30] Foreign Application Priority Data

Jul. 16, 1986 [JP] Japan .................. 61-167547

[51] Int. Cl.⁴ .......................... G11B 17/22
[52] U.S. Cl. ...................... 369/32; 368/43; 368/54; 368/111; 360/72.1
[58] Field of Search .......... 369/32, 43, 54, 111; 360/71, 72.1

[56] References Cited

U.S. PATENT DOCUMENTS

4,542,427 9/1985 Nagai .................. 360/72.1

Primary Examiner—Patrick R. Salce
Assistant Examiner—Anita M. Ault
Attorney, Agent, or Firm—Ladas & Parry

[57] ABSTRACT

A method and apparatus for assembling an information signal on a rotary recording medium comprising a pre-recorded track recorded with pre-recorded information signals and an unrecorded track not recorded with information signals by use of a light beam in which an information signal to be newly recorded on the rotary recording medium is recorded continuously from the pre-recorded information signal already recorded on the pre-recorded track. The apparatus by use of a light beam searches for a pre-recorded track turn which is a portion of the pre-recorded track immediately preceding the unrecorded track and continuously reproduces the information signal from the searched pre-recorded track turn as it waits for a command signal commanding the recording of the information signal to be recorded. Responsive to the command signal, the apparatus terminates the repetition of the reproducing operation of the searched track turn and commences the recording on the unrecorded track turn following the searched pre-recorded track turn.

9 Claims, 8 Drawing Sheets

← ROTATING DIRECTION
SCAN DIRECTION →

METHOD AND APPARATUS FOR RECORDING AN INFORMATION SIGNAL ON A ROTARY RECORDING MEDIUM

BACKGROUND OF THE INVENTION

The present invention generally relates to methods and apparatus for recording an information signal on a rotary recording medium, and more particularly to a method and apparatus for assembling an information signal on a rotary recording medium comprising a pre-recorded track recorded with pre-recorded information signals and an unrecorded track not recorded with information signals, in which an information signal is newly recorded on an unrecorded track turn which is a portion of the unrecorded track immediately following a pre-recorded track turn, the pre-recorded track turn being a portion of the pre-recorded track located at an end of the pre-recorded track, in such a manner that the information signal to be newly recorded on the unrecorded track turn is recorded continuously from the end of the pre-recorded information signal recorded on the pre-recorded track turn.

Conventionally, there is a recording and reproducing apparatus capable of recording and reproducing an information signal on and from a rotary recording medium such as an optical disc hereinafter referred to as a disc along a spiral track by scanning a light beam. In such an apparatus, there are instances that a user wishes to record a new information signal on a disc having an unrecorded track not yet recorded with information signals and a pre-recorded track already recorded with pre-recorded information signals in such a manner that the newly recorded information signal is recorded continuously from the pre-recorded signals without causing any interruption of recording between the pre-recorded signals recorded on the pre-recorded track and the newly recorded signal recorded on the unrecorded track. Such a recording operation will be referred to hereinafter as assembling.

In the following description, a term track turn is used in a sense to indicate a portion of the track scanned by the light beam during one revolution of the disc.

Conventionally, the assembling of new information signal on the disc is achieved by scanning an unrecorded track turn immediately following a pre-recorded track turn using a recording and reproducing device producing the light beam. The light beam repeatedly scans the unrecorded track turn while waiting for a video signal to be newly recorded to the disc, and in response to the video signal to be recorded, the operation mode of the recording and reproducing device is switched from a reproducing mode to a recording mode and the the video signal to be newly recorded is recorded on the unrecorded track turn.

In the aforementioned assembling operation, the light beam repeatedly scans the unrecorded track turn of the disc by moving repeatedly backward by one track pitch across the track at each end of the track turn during one revolution of the disc with a timing predetermined relative to the rotaion of the disc. This movement is referred to hereinafter as a jump. As the assembling starts with a position which is located at the beginning of the unrecorded track turn, the recording and reproducing device has to be jumped back to this position each time the light beam scans the end of the track turn.

Unfortunately, the operation of an actuator causing the jump of the light beam is not stable for those intervals immediately after the jump, so that some extent of unstability in the scanning of the light beam is inevitable. As a result, the conventional method of assembling the information signal on the disc has a problem that the recording is unstable particularly for those portions of the unrecorded track turn which immediately follows the pre-recorded track turn at which the assembling operation begins.

SUMMARY OF THE INVENTION

Accordingly, it is an object of the present invention to provide a novel and useful method and apparatus for assembling an information signal on a rotary recording medium in which the problems aforementioned are eliminated.

Another and more specific object of the present invention is to provide a method and apparatus for assembling an information signal on a rotary recording medium having a pre-recorded track comprising one or a plurality of pre-recorded track turns recorded with pre-recorded information signals and an unrecorded track comprising one or a plurality of unrecorded track turns not recorded with information signals by recording and reproducing means selectively operated in a recording mode and in a reproducing mode in such a manner that a new information signal is recorded on an unrecorded track turn immediately following a pre-recorded track turn located at the end of the pre-recorded track continuously from the pre-recorded information signal recorded on the pre-recorded track turn, wherein the pre-recorded track turn immediately preceding the unrecorded track turn is searched by feeding the recording and reproducing means operating in the reproducing mode across the unrecorded and/or pre-recorded track turns repsonsive to an assemble mode command signal commanding an assembling operation, repeatedly scanning the searched pre-recorded track turn by jumping the recording and reproducing means operating in the reproducing mode by one track pitch inwards across the end of the searched track turn to the beginning of the searched track turn, scanning the unrecorded track turn immediately following the searched prerecorded track turn by the recording and reproducing means by prohibiting the recording and reproducing means from jumping back to the beginning of the track turn at the end of the searched track turn, and switching the operation mode of the recording and reproducing means from the reproducing mode to the recording mode at a recording start position on the unrecorded track turn immediately following the pre-recorded track turn. The switching of the operation mode of the recording and reproducing apparatus may be made responsive to a detection of the beginning of the unrecorded track turn or may be made responsive to a synchronizing signal contained in the information signal.

According to the present invention, the recording and reproducing apparatus is not moved across the track at the critical moment when the assembling operation commences, and the recording of the new information signal is started in continuation from the pre-recorded signal recorded in the preceding track turn. As a result, the problem of the instability of scanning of the recording and reproducing device is eliminated and the newly recorded signal can be recorded on the unrecorded track turn extending from the pre-recorded track turn in a smooth and continuous manner without interruption of the recording.

Other objects and further features of the present invention will be apparent from the following detailed description when read in conjunction with the attached drawings.

DETAILED DESCRIPTION

Figure 1:
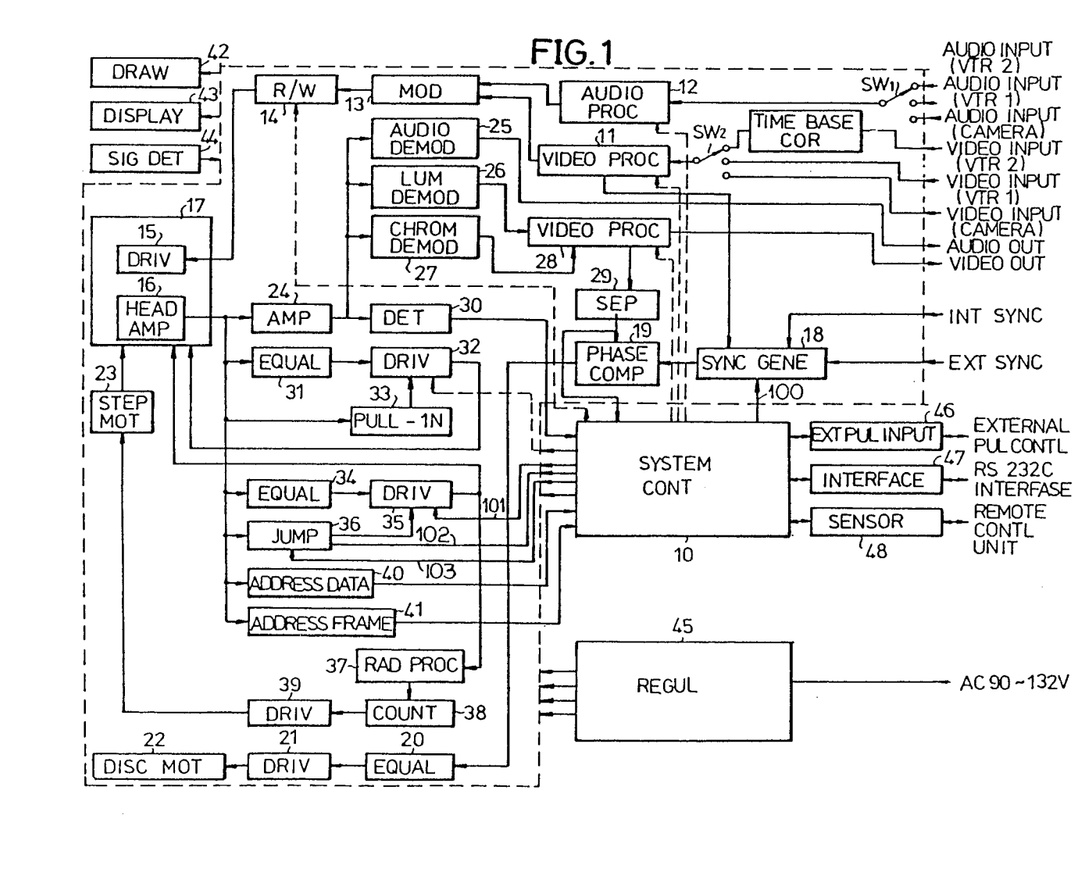
FIG. 1 is a system block diagram showing an embodiment of a disc recording and reproducing apparatus to which the present invention is applicable.
Figure 2:
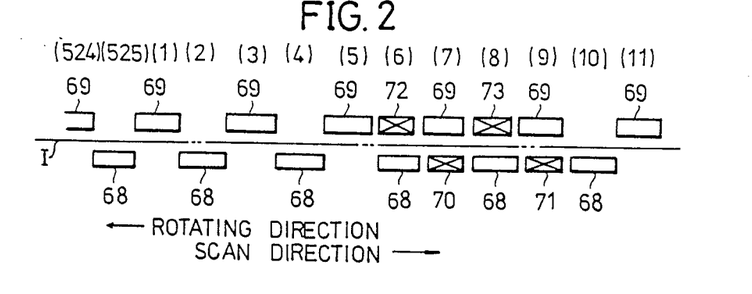
FIG. 2 is a schematic enlarged view showing a track of the disc for explanation of an address signal used in the present invention.

FIG. 1 shows an embodiment of a disc recording and reproducing apparatus to which the method and apparatus according to the present invention may be applied. In other words, it may be regarded that FIG. 1 shows an embodiment of the present invention. FIG. 2 shows an embodiment of an essential part including a system controller of the apparatus shown in FIG. 1.

First, a general description will be given on the disc recording and reproducing apparatus to which the present invention may be applied, by referring to FIG. 1. In a recording mode, an information signal such as an input video signal is obtained from one of a first video tape recorder VTR1, a camera and a second video tape recorder VTR2 via a time base corrector by selecting a connecting position of a switch SW2. A corresponding input audio signal is obtained from the first video tape recorder VTR1, the second video tape recorder VTR2 or the camera respectively, by selecting a connecting position of a switch SW1. The input video signal is supplied to a modulator 13 via a video signal processor 11, while the input audio signal is supplied to the modulator via an audio signal processor 12. The processed input video and audio signals are modulated into a signal having a predetermined signal format in the modulator 13. A modulated signal from the modulator 13 is supplied to a laser diode (not shown) via a read/write switching circuit 14 and a laser diode (LD) driver 15 so as to control the intensity of light emitted from the laser diode depending on the information contents of the modulated signal. The light from the laser diode is irradiated on an optical disc (not shown) which is used as an example of the information recording medium, to record the modulated signal on the optical disc.

The optical disc is rotated by a disc motor 22 to undergo synchronous rotation. The disc motor 22 is controlled by a control signal which is derived from an external synchronizing signal. A circuit comprising a synchronizing signal generator 18, a phase comparator 19, an equalizer 20 and a driver 21 generate the control signal from the external synchronizing signal. The LD driver 15 is mounted on an optical base 17 together with a head amplifier 16, and the optical base 17 is fed in a predetermined direction by a stepping motor 23 in the recording mode.

In a reproducing mode, a reproduced RF signal is obtained by detecting the change in the intensity of light reflected from the optical disc by scanning the optical disc with a main light beam. The reproduced RF signal is passed through the head amplifier 16 and an RF signal amplifier 24. The reproduced RF signal obtained via the RF signal amplifier 24 is supplied to an audio signal demodulator 25, a luminance signal demodulator 26 and a carrier chrominance signal (color signal) demodulator 27. A reproduced luminance signal from the luminance signal demodulator 26 and a reproduced carrier chrominance signal from the carrier chrominance signal demodulator 27 are supplied to a video signal processor 28 wherein the reproduced signals are converted into a reproduced color video signal having a predetermined signal format. A synchronizing signal separator 29 separates a synchronizing signal from a signal which is obtained from the video signal processor 28. The synchronizing signal from the synchronizing signal separator 29 is supplied to the phase comparator 19.

The reproduced RF signal obtained via the RF signal amplifier 24 is supplied to an RF signal detecting circuit 30 which detects the RF signal, and an output detection signal from the RF signal detecting circuit 30 is supplied to a system controller 10. A signal which is obtained by detecting the change in the intensity of light reflected from the optical disc by scanning the optical disc with sub light beams different from the main light beam is also obtained from the head amplifier 16. In the description hereinafter, the main light beam and the sub light beams are referred to simply as reproducing light beams for the sake of convenience. This signal from the head amplifier 16 is supplied to a focus servo circuit consisting of an equalizer 31, a driver 32 and a pull-in circuit 33. The focus servo circuit produces a focus servo signal for controlling the focus so that the main light beam hits the optical disc in focus, and this focus servo signal is supplied to the optical base 17. The pull-in circuit 33 maintains the focus of the main light beam. In other words, the driver 32 is excited within a predetermined period when the focus servo operation is carried out in a closed loop, and the pull-in circuit 33 is used to detect the peaks in the output of the head amplifier 16 and stop the excitation when carrying out the focus servo in the closed loop.

In the present embodiment, the optical base 17 constitutes a part of an optical recording and reproducing means for recording and reproducing a signal on and from the optical disc by use of the light beams.

The output signal of the head amplifier 16 is also supplied to a tracking servo circuit constituted by an equalizer 34, a driver 35 and a jump circuit 36. The tracking servo circuit produces a tracking error signal which is supplied to the optical base 17 for controlling the tracking. The tracking servo circuit and the focus servo circuit described before are used not only in the reproducing mode but also in the recording mode.

The output signal of the driver 35 is also supplied to the stepping motor 23 via a radial processing circuit 37, a counter 38 and a driver 39, so as to control the rotation of the stepping motor 23. The radial processing circuit 37 drives the stepping motor 23 to move the entire optical base 17 along a radial direction of the optical disc when the output voltage of the driver 35 exceeds a predetermined level. This output voltage of the driver 35 is used to drive a rotary mirror (not shown) of the optical base 17. As a result, the rotary mirror is always controlled about its neutral position.

The output signal produced by the head amplifier 16 responsive to the reflection of the sub light beam is supplied to an address data detecting circuit 40, and the address data detecting circuit 40 detects an address data which is recorded on the disc when the disc is manufactured. The output signal from the head amplifier 16 is also supplied to an address frame detecting circuit 41 which produces an address frame detection signal to be described later in synchronization with the timing of the reproduced address signal aforementioned. Output signals from the address data detecting circuit 40 and the address frame detecting circuit 41 are supplied to the system controller 10, respectively.

Next, a description will be given on a disc rotated by the disc motor 22. The disc is provided with a guide track (pre-formed pits) as in the case of the disc previously proposed in a U.S. patent application Ser. No. 873,407 filed June 12, 1986 in which the assignee is the same as the assignee of the present application. In addition, it will be assumed that the optical disc is recorded with an address signal between the pre-formed pits as previously proposed in a U.S. patent application Ser. No. 917,188 filed Oct. 9, 1986 in which the assignee is the same as the assignee of the present application.

In other words, a recording surface of the optical disc is divided into a plurality of imaginary equiangular sectoral regions, and a guide track comprising a spiral track or concentric tracks is formed on the recording surface so that each track turn of the guide track is constituted by a row of pits formed in every other equiangular sectoral region. The pit is only formed in one of two mutually adjacent track turns of the guide track so that the pits are formed in every other track turn of the guide track in a radial direction of the disc in each of the equiangular sectoral regions. An intermediate part between center lines of the two mutually adjacent track turns of the guide track is used for forming an information signal recording track for an information signal at the time of a recording.

In FIG. 2, a two-dot chain line I indicates a center line of an information signal recording track formed on the CAV (Constant Angular Velocity) system optical disc which is to be rotated at a constant angular velocity. Pre-formed pits 68 of a track turn of the guide track are formed for every other 1H (one horizontal scanning period) on the lower side of the two-dot chain line I (that is, inner peripheral side of the disc), and preformed pits 69 of a track turn of the guide track are formed for every other 1H on the upper side of the two-dot chain line I (that is, outer peripheral side of the disc). The optical disc comprises a recording surface which is divided into a plurality of equiangular sectoral regions and a guide track formed on the recording surface, 60 where each track turn of the guide track is constituted by a row of intermittent pits 68 (or 69) formed in every other equiangular sectoral regions, and the pit 68 (or 69) is only formed in one of two mutually adjacent track turns of the guide track in each equiangular sectoral region so that the pits 68 (Or 69) are formed in every other track turns in a radial direction of the optical disc in each equiangular sectoral region.

In FIG. 2, portions 70 through 73 indicated with an "X" mark indicate recording portions where an address signal is pre-recorded. In the track turn of the guide track on the inner peripheral side of the optical disc, the recording portions 70 and 71 are respectively arranged between two pits 68. Similarly, in the track turn of the guide track on the outer peripheral side of the optical disc, the recording portions 72 and 73 are arranged between two pits 69. In other words, address signals containing identical address information are pre-recorded at two positions in each track turn of the guide track when the optical disc is produced, so as to enable an address error checking. The address signals recorded in the recording portion 70 through 73 consist of digital data having a predetermined signal format. The address signal is modulated according to a predetermined modulation system such as the phase encoding (PE) before being recorded on the optical disc.

The recording portions 70 through 73 are scanned by sub light beams of the optical recording and reproducing means to reproduce the address signals when recording the information signal on the optical disc. The disc motor 22 and the rotational phase of the optical disc are controlled responsive to an error voltage which is obtained by comparing the phase of a pulse signal which rises in synchronism with an edge of the address signal first reproduced from the recording portion 72 and the phase of a pulse signal which is produced from a frame pulse signal. The information signal is recorded at the position indicated by the two-dot chain line I at the rate of two fields (that is, one frame) per one revolution of the optical disc by the main light beam of the optical recording and reproducing means. The numbers in brackets in FIG. 2 indicate scanning line numbers of a composite video signal within the information signal.

Since the recording portions 70 and 71 (or 72 and 73) are recorded with the address signals which indicate the track number of the information signal recording track indicated by the two-dot chain line I in FIG. 2, identical address signals are reproduced two times in one revolution of the optical disc. The track number also indicates a frame number, and therefore is also referred to as a frame address.

Returning to FIG. 1, a drawer 42 lowers a disc tray (not shown) containing the optical disc in response to a signal from a circuit part indicated by a phantom line in FIG. 1 when the signal detector 44 for detecting various signals detects that the disc tray is closed. The optical disc on the lowered disc tray is placed on a turntable (not shown) and clamped thereon. On the other hand, when the signal detector 44 detects that an eject switch (not shown) is turned ON, the drawer 42 raises the disc tray in response to a signal from the circuit part so as to eject the optical disc form the apparatus. Various modes of the apparatus and the like are displayed on a display device 43.

A regulator 45 supplies D.C. power source voltages to various parts (circuit part) of the apparatus indicated by the phantom line in FIG. 1. The system controller 10 is also supplied with signals from an external pulse input part 46, and interface 47 and a sensor 48.

Figure 3:
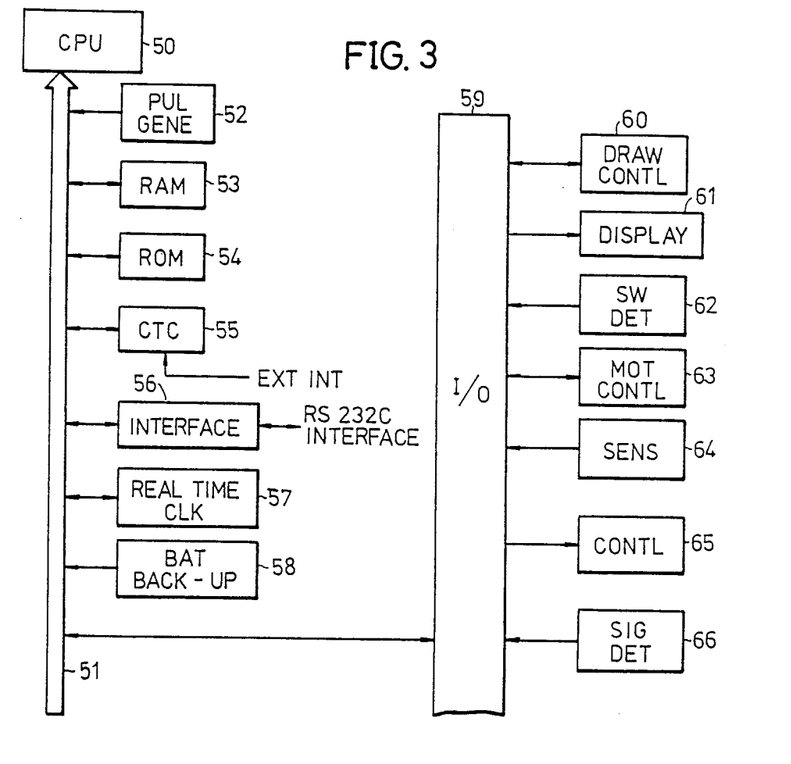
FIG. 3 is a system block diagram showing an embodiment of an essential part of the block system shown in FIG. 1.

As shown in FIG. 3, the system controller 10 comprises a central processing unit (CPU) 50, and a pulse generator 52, a random access memory (RAM) 53, a read only memory (ROM) 54, a counter timer circuit (CTC) 55, an interface 56 corresponding to the interface 47 (shown in FIG. 1), a real time clock 57, a battery back-up 58 and an input/output (I/O) device 59 which are respectively coupled to the CPU 50 via a bus line 51. The pulse generator 52 generates various pulses including system reset pulses and a system clock pulses. The CTC 55 comprises a counter and a timer for generating an interrupt. The real time clock 57 generates calendar clock pulses for the year, month, day hour, minute and second.

The I/O device 59 is coupled to a drawer controller 60 for controlling the drawer part 42, a display part 61, a switch detector 62, a controller 63 for controlling the stepping motor 23, a remote control sensor 64 corresponding to the sensor 48, a controller 65, and a signal detector 66 which corresponds to the signal detector 44.

In FIG. 3, the drawer controller 60 constitutes a part of the drawer part 42, and the display part 61 constitute a part of the display device 43 shown in FIG. 1. In addition, the switch detector 62, the remote control sensor 64 and the signal detector 66 constitute a part of the signal detector 44. Other remaining parts shown in FIG. 2 substantially constitute the system controller 10. A known integrated circuit chip Z80 may be used for the CPU 50 shown in FIG. 3.

Figure 4A:
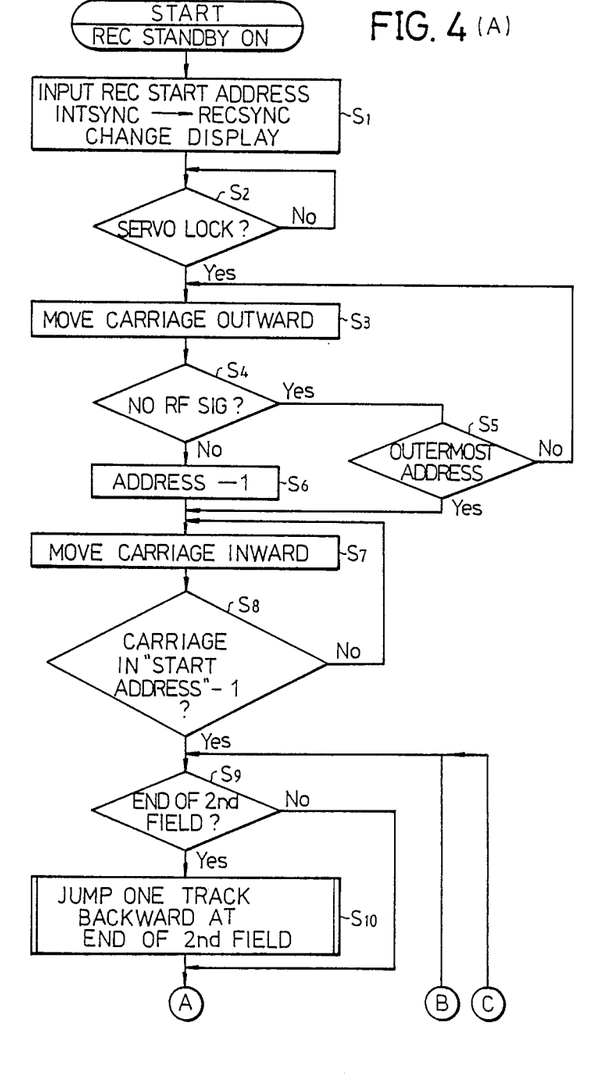
FIGS. 4(A)–4(C) are flow charts for explanation of the operation of the first embodiment of the present invention.

Next, a description will be given on a first embodiment of the present invention. When there is a key input from the remote control key (sensor 48) or a command input from the interface 47 when the disc recording and reproducing apparatus shown in FIG. 1 is in the reproducing mode, the system controller 10 executes an operation shown in FIGS. 4(A)–4(C).

In a step S1, the system controller 10 is first supplied with an assembling operation command signal commanding an assembling operation from a switch or a key (not shown) operated by a user via the interface 47 or the sensor 48. This command signal also indicates an address of an unrecorded track turn at which the assembling is to be started. Responsive to the command signal, the system controller 10 in the step 1 supplies a control signal (switching signal) via a line 100 to the synchronizing signal generator 18 in FIG. 1 to cause the synchronizing signal generator 18 supplying an internal synchronizing signal (INT SYNC) to supply another synchronizing signal (REC SYNC) contained in the video signal supplied to the synchronizing signal generator from the video processor 11. At the same time the system controller 10 controls the display device 43 to display a sign indicating "stand by for recording".

The unrecorded track aforementioned is the unrecorded track turn following directly to a track turn already recorded with the information signal. This unrecorded track may be searched automatically by a method and apparatus described in the U.S. patent application entitled "Method and Apparatus for Automatically Searching Desired Track Position or Recording Region on Information Recording Medium38 filed May 6, 1987 in which the assignee is the same as the assignee of the present application, in which the unrecorded track turn is searched on the basis of exsistance or nonexistance of a reproduced radio frequency (RF) signal reproduced therefrom. Of course, it is possible for the user to indicate the unrecorded track directly through the assembling operation command signal in such cases where the user uses a table in which the addresses of the pre-recorded track turn and the unrecorded track turn are registered.

In a step S2, the system controller 10 confirms that the focus servo circuit and the tracking servo circuit are operating properly in a locked in mode and the main light beam is properly focused on the disc, and if this has been achieved, the system controller 10 supplies a control signal to the driver 35 in a step S3 via a line 101 to cause the feed of the optical base 17 toward an outer periphery of the disc (which is the same as the normal feeding direction in the case of recording as well as reproducing).

During the feeding of the optical base 17, the controller 10 detects the existence of the reproduced RF signal on the basis of the output signal from the RF signal detecting circuit 30 in step S4. If no reproduced RF signal is detected as the disc is not recorded with information signals on the track turns outside of the track turn having the recording start address, the feeding operation of the optical base 17 is continued in steps S4 and S5 until an address data indicating the outermost track is detected.

The detection of the address data aforementioned may be achieved for example on the basis of an output signal from the address data detecting circuit 40 which detects the address data from the reproduced RF signal produced responsive to the reflection of one of the sub light beams scanning the pre-formed pits 69 located at an inner side of the center line I of the information signal recording track. It should be noted that another of the sub light beams scans the pre-formed pits 68 located at the outer side of the center line I of the information recording track.

If the reproduced RF signal is detected, the system controller 10 subtracts one from the address of the pre-recorded track turn from which the reproduced RF signal is first detected, and stores this address data in a step S6. It should be noted that the track turn having the stored address is the last of the unrecorded track turns extending outward to the unrecorded track turn at which the recording should be started.

The system controller 10 then produces a control signal for feeding the optical base 17 toward an inner periphery of the disc and supplies this control signal to a driving circuit of the stepping motor 23 including the driver 35, radial processing circuit 37, counter 38 and the driver 39 in a step S7. In a step S8, it is discriminated whether the optical base 17 has moved to a track turn located one track pitch inward from the track turn at which the recording is to be started. This track turn on which the optical base 17 is scanning has an address which is smaller by one address than the address of the track turn at which the recording is to be started. In case the discrimination result is YES, the system controller 10 terminates the supply of the control signal for feeding the optical base 17 in a step 9 and discriminates whether the reproducing light beams are scanning a portion of the track turn on which are recorded a second field of the recorded information signal by examining the reproduced RF signal reproduced from the track.

If it is discriminated that the optical base 17 is scanning a portion of the track turn corresponding to an end portion of a second field of the information signal recorded on the track, the system controller 10 produces in a step 10 a trigger pulse which causes a jump of the reproducing light beams responsive to the recording synchronizing signal at the end of the field. Responsive to the trigger pulse, the reproducing light beams scanning the track turn jump back to the beginning of the track turn. As a result, the information signal recorded on the track turn is reproduced repeatedly. Thus, in case neither the recording start command signal nor a mode clear signal for clearing the assembling operation mode is supplied in this state, the jump of the reproducing beams at the end of the second field of the recorded signal on the track turn is repeated. Thus, the steps of S9, S10 in FIG. 4(A) and S11 and S12 to be described with reference to FIG. 4(B) later are repeated.

Figure 4C:
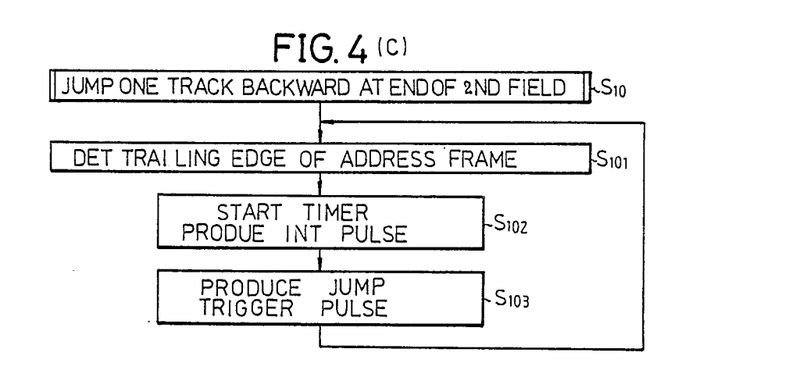
Figure 5:
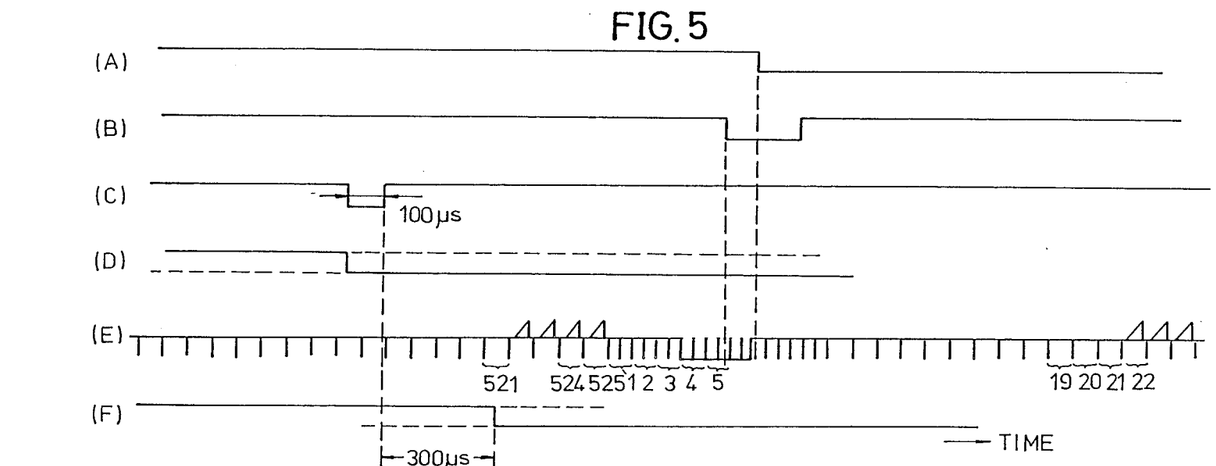
FIGS. 5(A)–5(F) are wave form charts for explanation of the first embodiment of the present invention.

Next, the operation of the step S10 in which the reproducing beams are jumped back by one track pitch at the end of the second field of the recorded information signal responsive to the synchronizing signal will be described in detail with reference to FIGS. 4(C) and 5. It should be noted that the step S10 in FIG. 4(C) corresponds to the step S10 in FIG. 4(A). In step S101, the system controller 10 detects the trailing edge of an address frame signal produced by the address frame detecting circuit 41 in FIG. 1. This address frame signal is a signal which changes its level to a high level in response to the detection of the synchronizing signal in the reproduced address signal reproduced from the address signal recording portion 72 as shown in FIG. 5(A).

It should be noted that the rotation of disc motor 22 is controlled by the error signal obtained by phase comparison of the synchronizing signal of the information signal to be recorded supplied from the synchronizing signal generator 18 and the reproduced synchronizing signal. As a result, the phase of the trailing edge of the address frame signal and that of the synchronizing signal contained in the information signal to be recorded is determined uniquely once a disc servo circuit comprising the synchronizing signal generator 18, phase comparator 19, equalizer 20, driver 21 and the disc motor 22 is locked in.

As a result of this servo control of the disc rotation, it becomes possible to record the information signal on the track along the line I in FIG. 2 in such a manner that the information signals corresponding to the sixth horizontal scanning period and the eighth horizontal scanning period respectively locate adjacent to the address signal recording portions such as the pre-formed pits 72 and 73. With this recording scheme, it is possible to discriminate whether the the track turn on which the reproducing light beams are scanning are the end of the first field or the end of the second field on the basis of the leading edge of the address frame signal. Thus, the system controller 10 produces the jump trigger pulse and a read/write timing control signal using the address frame signal as a reference while maintaining a proper horizontal synchronization.

The system controller 10 has a timer to be started responsive to the trailing edge of the address frame signal (not shown). The timer is started in a step S102 in FIG. 4(C) and produces an interrupting pulse after a predetermined time interval. Responsive to the interrupting pulse, a looping operation is started in the CPU 50 (FIG. 3) in a step S103 for a second predetermined time interval. After the second predetermined time has elapsed, the system controller 10 produces a first and second jump trigger pulse shown in FIGS. 5(C) and (D) respectively, through the I/O device 59 ) (FIG. 3) and supplies them to the jump circuit 36 via lines 102 and 103.

The jump circuit 36 produces a jump pulse having a polarity corresponding to the polarity of the second jump trigger pulse responsive to the first jump trigger pulse having a negative polarity and a pulse width of 100 microseconds. The jump pulse is then supplied to a rotary mirror actuating circuit (not shown) in the optical base 17 via the driver 35. In response to the jump pulse, the rotary mirror is actuated in such a manner that the reproducing light beams comprising the main light beam and two sub light beams are jumped back across the track by one track pitch at the end of the second field of the information signal pre-recorded on the pre-recorded track turn. As a result, the reproducing light beam is jumped to the beginning of the first field of the same frame of the information signal which was is previously reproduced from the identical track turn.

After the operation of step S103 has finished, the operation of the system controller 10 returns to step S101.

Thus, the recording and reproducing apparatus of FIG. 1 carries out a still picture reproducing when neither the recording start command signal nor the mode clear command signal is applied by repeatedly causing the jump of the reproducing light beams at the end of the second field of the pre-recorded information signal shown in FIG. 5(E) recorded on the last of the pre-recorded track turns. It should be noted that FIG. 5(B) shows a vertical synchronizing signal separated from the reproduced information signal by the synchronizing signal separator 29.

When it is descriminated in a step S11 that a recording start command signal is supplied in this state of still picture reproducing, the system controller 10 discriminates in a step S13 whether the reproducing light beams are scanning the end of the second field of the pre-recorded information signal shown in FIG. 5(E) recorded on the pre-recorded track turn. In a step S14, the jump of the reproducing light beam is terminated by terminating the supply of the first and second jump trigger pulses repsonsive to the detection of the end of the second field. In other words, the still picture reproducing is terminated. Then, the system controller 10 supplies a control signal shown in FIG. 5(F) to the read/write switching circuit 14 and switches the power of the laser beam produced by the laser diode (LD) (not shown) for irradiation of the disc (not shown) from a smaller power for reproducing to a larger power for recording.

When the control signal shown in FIG. 5(F) is in a high level state, the read/write switching circuit 14 blocks the supply of the output signal of the modulator 13 to its following circuit stages. The read/write switching circuit 14 then produces a driving signal to the LD driver 15 to cause the power of the light beam (laser output power) to switch to the small level appropriate for the reproducing responsive to the low level state of the control signal. When the level of the control signal is low, the read/write switcing circuit 14 passes the output signal of the modulator 13 to the LD driver and at the same time switches the output power of the laser diode LD to the high level appropriate for recording.

In the step S14, the control signal is switched from the low level to the high level in a vicinity of the 521st horizontal scanning period as shown by a solid line in FIG. 5(F). Thus, the operation mode of the laser diode LD is switched from the reproducing mode to the recording mode and the recording is started from the beginning of the unrecorded track turn following the pre-recorded track turn continuously. No unrecorded portion is formed at the beginning of the unrecorded track turn. It should be noted that the reproducing light beams are not jumped at the beginning of the recording. Thus, such a problem caused by the unstability of the scanning of the light beam inherent to the conventional assembling procedure is eliminated. According to the present invention, therefore, a relatively stable assembling operation is achieved. In the embodiment described, the trailing edge of the control signal is selected to appear approximately 300 microseconds later than the leading edge of the first jump trigger pulse shown in FIG. 5(C).

Figure 4B:
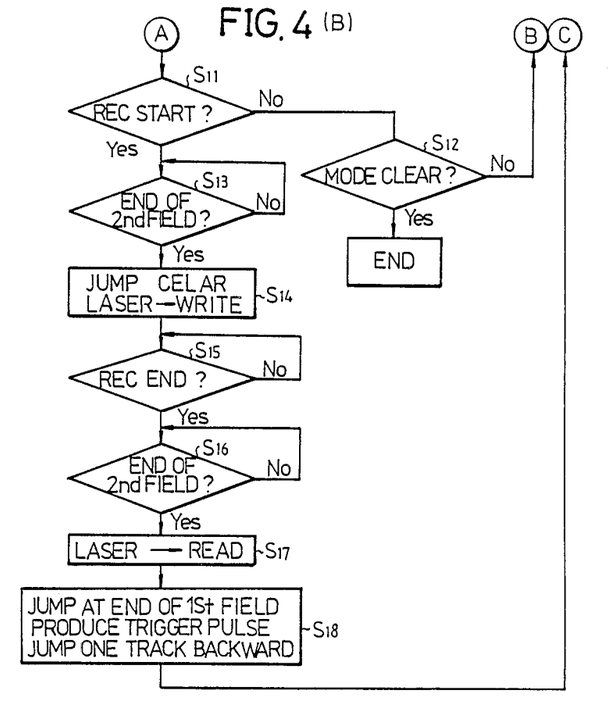

After the recording has started, the system controller 10 monitors for the recording end command signal signalling for the end of the recording operation as shown in a step S15 in FIG. 4(B). If the recording end command signal is supplied, the system controller 10 waits for the detection of the end of the second field of the information signal being recorded by referring to the address frame signal in a step S16. In a step S17, the system controller 10 switches the level of the control signal to be supplied to the read/write switching circuit 14 from low level to high level as shown in a phantom line in FIG. 5(F) in response to the detection of the second field. In a step S18, the system controller produces a jump trigger pulse responsive to the end of the first field to cause the reproducing light beams to jump back by one track pitch. After the step S18, the system controller 10 loopes back to the operation of the steps S9–S12 and waits for the incoming of the mode clear command signal while repeatedly reproducing the last track turn at which the recording is terminated.

Figure 6:
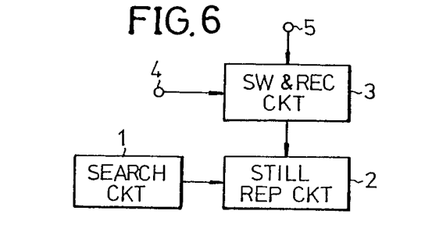
FIG. 6 is a schematic block diagram showing a fundamental construction of the apparatus according to the present invention.

FIG. 6 is a schematic system block diagram showing the construction of the apparatus for performing the operation described heretofore. The apparatus in FIG. 6 corresponds to a part of the recording and reproducing apparatus in FIG. 1, and comprises a searching circuit 1 for performing the operation of the steps of S1–S8, a still picture reproducing circuit 2 for performing the operation of steps S9–S12 and S101–S103, and a switch to record circuit 3 for performing the operation of steps S13 and S14. The searching circuit 1 comprises the system controller 10, stepping motor 23 and associated circuits to the stepping motor 23 including the driver 35, radial processing circuit 37, counter 28 and the driver 39. The still picture reproducing circuit 2 comprises the system controller 10, jump circuit 36, driver 35 and the optical base 17, and the switch to record circuit 3 comprises the system controller 10, read/write switching circuit 14, and the LD driver 15.

Figure 7:
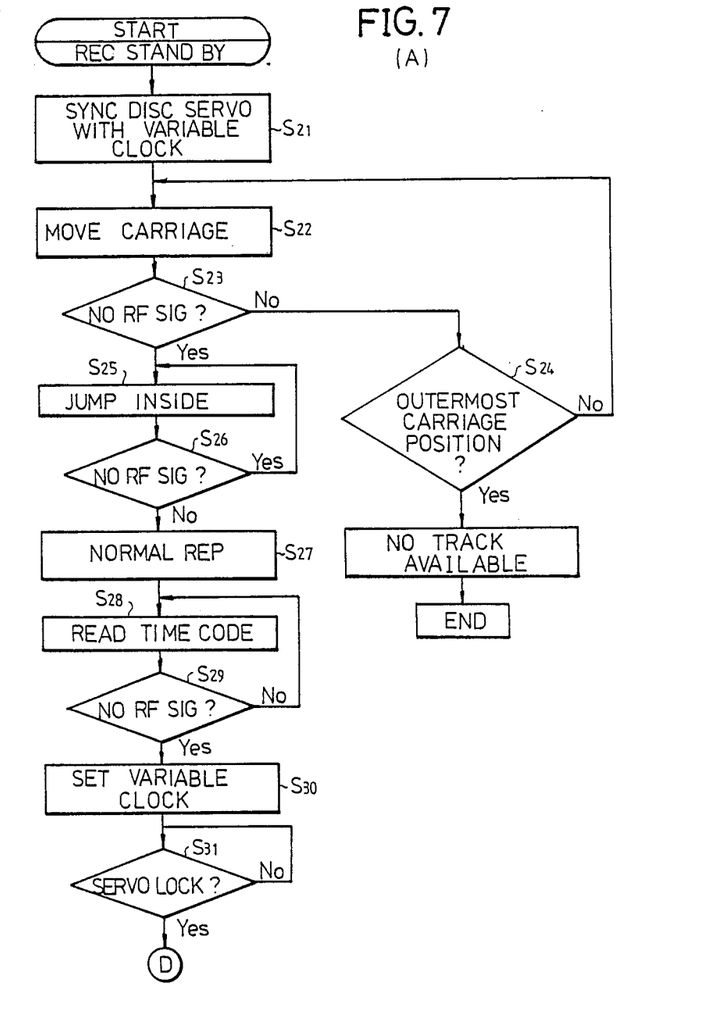
FIGS. 7(A)–(C) are flow charts for explanation of the operation of a second embodiment of the present invention.

Next, a second embodiment of the present invention will be described with reference to flow charts in FIGS. 7(A)–(C). The present embodiment deals with an assembling of an information signal on a constant linear velocity (CLV) information recording disc. In a CLV disc, pre-formed pits similar to those shown in FIG. 2 are formed along a track. As the rotation speed of a CLV disc changes with a radial location of the track on which the reproducing light beams are scanning, location of a vertical blanking interval included in the information signal on the track is not aligned with the radial direction of the disc. Because of this reason, the address signal cannot be recorded when the disc is manufactured. As a result, the address frame signal as shown in the first embodiment cannot be produced.

In the present embodiment, the system controller 10 as shown in FIG. 1 first switches the disc servo circuit in a step S21 responsive to the assembling mode command signal from the reproducing mode in which the disc servo circuit is synchronized to the reproduced horizontal synchronizing signal to a variable clock-lock in mode in which the disc servo circuit is synchronized to a variable clock signal which is obtained by dividing a predetermined frequency of an oscillator (not shown) responsive to the location of the reproducing light beams on the disc. At the same time, the system controller 10 controls the display device 43 to display a sign indicating "standby for recording". In a step S22, the system controller 10 supplies a control signal to the driving circuit of the stepping motor 23 which feeds the optical base 17 for a predetermined amount to the outer periphery of the disc. Further, the system controller 10 reduces the frequency of the variable clock in response to the location of the reproducing light beams on the disc. In this state, the laser diode LD is producing a low output power light beam for reproducing and the RF detecting circuit 30 for reproducing the information signal from the disc is still operating. In a step S23, the system controller 10 discriminates whether the reproduced RF signal exists or not. In the case reproduced RF signals exist, the system controller 10 repeats the operation of the steps S22 and S23 until an unrecorded track is detected. In case no unrecorded track is found even when the optical base 17 is fed to the outermost track turn of the disc, the system controller 10 displays a sign in the display device indicating no track is available for recording in a step S24.

If an unrecorded track turn is found by the non-appearance of the reproduced RF signal, the system controller 10 produces the first and second jump trigger pulses aforementioned in a step S25 to cause a jump of the reproducing light beams by one track pitch backward to the track turn located inside the track turn at which the non-appearance of the reproduced RF signal was observed. In a step S26, the system controller 10 discriminates whether the reproduced RF signal is present or not, and in case there is a reproduced RF signal, the system controller 10 switches the operation mode of the disc servo circuit from the variable clock-lock in mode to a mode in which the disc servo circuit is operated in synchronization with the reproduced RF signal whereby the operation mode of the recording and reproducing apparatus is switched from the "standby for recording" state to the normal reproducing mode in a step S27.

The pre-recorded track turn aforementioned is recorded with an address signal indicating a position of the disc referred to as a time code. In a step S28, the time code is reproduced by the normal reproducing operation in the step S27 from the pre-recorded track turn immediately preceding the unrecorded track turn searched in the step S26. This time code is separated from the reproduced RF signal by the address data detecting circuit 40 and is supplied to the system controller 10. In a step S29, the system controller 10 discriminates whether there is a reproduced RF signal or not, and if not, the system controller 10 sets the variable clock in a step S30 responsive to the time code of the pre-recorded track turn immediately preceding the unrecorded track turn at which the reproduced RF signal disappeared.

Thus, it may be understood that the stepping motor 23 and the associated circuits thereto comprising the driver 35, radial processing circuit 37, counter 28 and the driver 39 constitutes a searching circuit similar to the searching circuit 1 in FIG. 6 which searches for the unrecorded track turn at which the recording is to be started.

The setting of the variable clock and the control of the disc motor 22 is described in a U.S. patent application Ser. No. 929,597 entitled "Rotation Control Apparatus for Constant Linear Velocity System Information Recording disc" filed Nov. 10, 1986 in which the assignee is the same as the assignee of the present invention. In the above U.S. patent application, the rotation speed of the disc motor 22 is calculated from the address signal (time code) reproduced from the pre-recorded track turn immediately preceding the unrecorded track turn. On the basis of this calculated rotation speed, the frequency of the signal produced by the oscillator in the system controller 10 is divided, and a signal thus obtained is supplied to the driver 35 cooperating with the disc motor 22.

In a step 31, the system controller 10 confirms first whether the tracking servo circuit and the focus servo circuit are locked in, and then carries out a still picture reproducing responsive to a rotation control signal controlling the rotation of the disc. The rotation control signal aforementioned is reproduced from an annular track formed on a region of the disc different from those regions on which are recorded the information signals as disclosed in a Japanese Patent Application No. 60-223164 in which the applicant is the same as the assignee of the present invention. In this annular track, a series of pulses are recorded within a predetermined period. In one example, 105 rotation control signals are reproduced responsive to such pulses on the annular track during one revolution of the disc.

As is well known, the rotation speed of the disc changes responsive to the position of the reproducing light beam. In the disc disclosed in the above Japanese Patent Application, 105 of such rotation control signals are always reproduced responsive to the one revolution of the disc regardless of the position on the track the reproducing light beam is scanning. In the present embodiment, the system controller 10 produces the first and second jump trigger pulses each time 105 of the rotation control signals are reproduced. As in the first embodiment, the reproducing light beams are jumped back by one track pitch backward responsive to the first and second jump trigger pulses. Thus, it may be understood that the jump of the reproducing light beams are made responsive to one revolution of the disc and independent of the synchronizing signal contained in the reproduced information signal or the information signal to be recorded.

In a step S33 in FIG.5(B), the system controller 10 discriminates whether the reproduced RF signal is present or not, and in case there is a reproduced RF signal, the reproducing light beams are jumped by one track pitch toward the outer or inner periphery of the disc in a step S34 depending on the position of the track on which the reproducing light beam, is scanning. Thereafter, the system controller 10 loops back to the step S32 and the still picture reproducing is repeated. In case no reproduced RF signal is detected, the system controller 10 detects for the incoming of the recording start command signal in a step S35. In case no recording start command signal is supplied, the system controller 10 detects for the incoming of the mode command clear signal in a step S36. In case no mode clear command signal comes in, the system controller 10 loops back to step S32. Thus, unless neither the recording start command signal nor the mode clear command signal is supplied, the system controller 10 carries out the steps S32–S36 repeatedly to reproduce the information signal recorded on the track turn which immediately precedes the unrecorded track turn from which the recording for the assembling is to be started. Thus, the system controller 10, jump circuit 36, driver 35 and the optical base 17 performing the steps S32–S36 constitute the still picture reproducing circuit similar to circuit 2 in FIG. 6.

During this state, the recording start command signal may be supplied. In this case, the system controller 10 waits for the end of the second field on the basis of the synchronizing signal in a step S37, and responsive to the end of the second field, the system controller 10, in a step S38, prohibits the jump of the reproducing light beams and produces the control signal to the read/write switching circuit 14 which causes the switching of the output power of the laser beam from the smaller level for reproducing to the larger level for recording. Thus, the recording is started from the moment the vertical synchronizing signal contained in the information signal comes in.

Next, the operation of the step S37 will be described in more detail with reference to FIG. 7(C). In a step S201, a trailing edge of the vertical synchronizing signal as shown in FIG.5(B) contained in the information signal to be recorded from the synchronizing signal separator 29 is detected. Responsive to the detection of the trailing edge of the vertical synchronizing signal, the timer aforementioned is started. After a predetermined time has elapsed, the system controller 10 produces an interrupting pulse at the end of the first field and at the end of the second field in a step S202. If it is discriminated that the vertical synchronizing signal corresponds to the first field of the information signal on the basis of the frame synchronizing signal obtained from the recording synchronizing signal, a looping operation is started in the CPU 50 in a step S203 for a predetermined time. After the predetermined time has elapsed, the system controller 10 operates at the end of the second field. In other words, the system controller 10 waits for the end of the second field, and responsive to the end of the second field, the switching of the output power of the laser beam is made in the step S38 as aforementioned. Thus, it may be understood that the controller 10 carrying out the operations of the steps S37 and S38, the read/write switching circuit 14, and the L/D driver 15 constitutes a switch to record circuit similar to the circuit 3 in FIG. 6.

The assembling of the information signal in the case of a CLV disc is achieved responsive to the vertical synchronizing signal contained in the information signal to be recorded on the unrecorded track turn.

After the recording has started, the system controller 10 waits for the supply of a recording end command signal commanding the end of the recording in a step S39. If the recording end command signal is supplied, the system controller 10 detects in a step S40 the end of the second field of the information signal being recorded. In a step S41, the system controller 10 changes the level of the control signal to be supplied to the read/write switching circuit 14 from the low level to the high level as shown in a phantom line in FIG. 5(F) to switch the output power of the laser beam from the high level for recording to the low level for reproducing.

When the operation of the step S41 is completed, the system controller 10 returns the step S32 and repeats the still picture reproducing in the steps of S33–S36 until the mode clear command signal is supplied in the step S36.

In the embodiments described heretofore, the jump of the reproducing light beams across the track is achieved by actuating the rotary mirror. However, the jump of the reproducing light beams may be obtained by shifting an objective lens for focusing the laser beam on the disc across the track.

The present invention is applicable not only to those discs consisting of one group of pre-recorded track turns and one group of unrecorded track turns but also applicable to those discs comprising many pre-recorded track turns in which the unrecorded track turns exist between the pre-recorded track turns.

Further, the present invention is not limited to these embodiments, but various variations and modifications may be made without departing from the scope of the present invention.

What is claimed is:

1. A method of recording an information signal on a rotary recording medium having a track comprising an unrecorded track not recorded with information signals and a pre-recorded track recorded with information signals and continuing to the unrecorded track by recording and reproducing means being selectively operated in a recording mode and a reproducing mode for recording information signals on and from the rotary recording medium in such a manner that an information signal is recorded on an unrecorded track turn which is a portion of the unrecorded track scanned by the recording and reproducing means during one revolution of the rotary recording medium continuously from a pre-recorded information signal recorded on a pre-recorded track turn, the pre-recorded track turn being a portion of the pre-recorded track scanned by the recording and reproducing means during one revolution of the rotary recording medium, the method comprising the steps of:

searching a pre-recorded track turn immediately preceding the unrecorded track by feeding the recording and reproducing means operated in the reproducing mode across the track responsive to a first command signal commanding a preparation mode for the recording;

repeatedly reproducing the information signal recorded on the searched pre-recorded track turn by moving the recording and reproducing means back to the beginning of the track turn by one track pitch at an end of the track turn;

scanning an unrecorded track turn immediately following the pre-recorded track turn by the recording and reproducing means continuously from the pre-recorded track turn to the unrecorded track turn responsive to a second command signal commanding a start of the recording by prohibiting the movement of the recording and reproducing means moving back to the beginning of the searched pre-recorded track turn; and switching the recording and reproducing means from the reproducing mode to the recording mode at a recording start location on the unrecorded track to cause the recording of the information signal.

2. A method of recording an information signal on a rotary recording medium as claimed in claim 1 in which said track turn is recorded with an address data at the end of a first and second portion thereof respectively recorded with a first and second field of the information signal, and said first command signal indicates the address of the recording start location at which the recording is to be started.

3. A method of recording an information signal on a rotary recording medium as claimed in claim 2 in which said recording start location is selected to be located at the beginning of the unrecorded track turn following the end of the pre-recorded track turn.

4. A method of recording an information signal on a rotary recording medium as claimed in claim 2 in which said recording and reproducing means further reproduces said address data in the step of repeatedly reproducing the information signal from the searched pre-recorded track turn, and the recording and reproducing means is moved back to the beginning of the searched pre-recorded track turn responsive to the reproduced address data indicating the end of the second field.

5. A method of recording an information signal on a rotary recording medium as claimed in claim 2 in which said step for repeatedly reproducing the information signal from the searched pre-recorded track turn further comprises a step wherein said rotary recording medium is rotated in synchronization with the information signal to be recorded on the rotary recording medium by comparing a synchronizing signal contained in the information signal with the reproduced address data.

6. A method of recording an information signal on a rotary recording medium as claimed in claim 2, in which said recording and reproducing means searches the pre-recorded track turn immediately preceding the unrecorded track turn responsive to the detection of a reproduced radio frequency signal reproduced from the track turn.

7. A method of recording an information signal on a rotary recording medium as claimed in claim 1 in which said recording and reproducing means is moved back by one track pitch as the recording and reproducing means rotates for one revolution in said step for repeatedly reproducing the searched pre-recorded track turn.

8. A method of recording an information signal on a rotary recording medium as claimed in claim 7 in which a timer is started in said step for scanning the unrecorded track turn responsive to said second command signal commanding the start of recording, and said step for switching the recording and reproducing means further comprises steps of retarding the timing to switch the recording and reproducing means from the reproducing mode to the recording mode until the recording and reproducing means moves to scan the unrecorded track turn immediately following the searched pre-recorded track turn and starting the recording responsive to a vertical synchronizing signal contained in the information signal to be recorded.

9. An apparatus for recording an information signal on a rotary recording medium having a track comprising an unrecorded track not recorded with information signals and a pre-recorded track recorded with information signals and continuing to the unrecorded track by recording and reproducing means being selectively operated in a recording mode and a reproducing mode for recording information signals on and from the rotary recording medium in such a manner that an information signal is recorded on an unrecorded track turn which is a portion of the unrecorded track scanned by the recording and reproducing means during one revolution of the rotary recording medium continuously from a pre-recorded information signal recorded on a pre-recorded track turn, the pre-recorded track turn being a portion of the pre-recorded track scanned by the recording and reproducing means during one revolution of the rotary recording medium, the apparatus comprising:

searching means for searching a pre-recorded track turn immediately preceding the unrecorded track by feeding the recording and reproducing means operated in the reproducing mode across the track responsive to a first command signal commanding a preparation mode for the recording;

still picture reproducing means for repeatedly reproducing the information signal recorded on the searched pre-recorded track turn by moving the recording and reproducing means back to the beginning of the track turn by one track pitch at an end of the track turn;

switch to record means for scanning an unrecorded track turn immediately following the pre-recorded track turn by the recording and reproducing means moving continuously from the pre-recorded track turn to the unrecorded track turn responsive to a second command signal which commands a start of the recording by prohibiting the movement of the recording and reproducing means moving back to the beginning of the searched pre-recorded track turn and which switchs the recording and reproducing means from the reproducing mode to the recording mode at a recording start location on the unrecorded track to cause the recording of the information signal.

* * * * *